(12) United States Patent
Ghosh et al.

(10) Patent No.: US 11,948,245 B2
(45) Date of Patent: Apr. 2, 2024

(54) RELIGHTING IMAGES AND VIDEO USING LEARNED LIGHTING AND GEOMETRY

(71) Applicant: Apple Inc., Cupertino, CA (US)

(72) Inventors: Shaona Ghosh, Campbell, CA (US); Mona Zehni, Urbana-Champaign, IL (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 17/455,167

(22) Filed: Nov. 16, 2021

(65) Prior Publication Data

US 2022/0157012 A1    May 19, 2022

Related U.S. Application Data

(60) Provisional application No. 63/114,264, filed on Nov. 16, 2020.

(51) Int. Cl.
| | | |
|---|---|---|
| *G06T 15/50* | (2011.01) | |
| *G06N 3/08* | (2023.01) | |
| *G06T 15/80* | (2011.01) | |

(52) U.S. Cl.
CPC ............. *G06T 15/506* (2013.01); *G06N 3/08* (2013.01); *G06T 15/80* (2013.01)

(58) Field of Classification Search
None
See application file for complete search history.

(56) References Cited

U.S. PATENT DOCUMENTS

| | | | | |
|---|---|---|---|---|
| 10,665,011 | B1* | 5/2020 | Sunkavalli | G06N 3/084 |
| 2020/0160593 | A1* | 5/2020 | Gu | G06T 7/90 |
| 2021/0264576 | A1* | 8/2021 | Sun | G06T 5/008 |
| 2022/0157012 | A1* | 5/2022 | Ghosh | G06T 15/506 |
| 2022/0157014 | A1* | 5/2022 | Sevastopolskiy | G06T 7/194 |
| 2022/0335636 | A1* | 10/2022 | Bi | G06T 7/586 |

OTHER PUBLICATIONS

Sengupta, et al., "SfSNet: Learning Shape, Reflectance and Illuminance of Faces in the Wild," Conference on Computer Vision and Pattern Recognition (CVPR) 2018.

(Continued)

*Primary Examiner* — Nurun Flora
(74) *Attorney, Agent, or Firm* — Blank Rome LLP (57) ABSTRACT

Novel machine learning (ML) models are introduced for image reconstruction training and inference workflows, which are able to estimate intrinsic components of single view images, including albedo, normal, and lighting components. According to some embodiments, such models may be trained on a mix of real and synthetic image datasets. For training on real datasets, both reconstruction and cross-relighting consistency terms may be imposed. The use of a cross-relighting consistency term allows for the use of multiple images of the same scene—although lit under different lighting conditions—to be used during training. At inference time, the model is able to operate on single or multiple images. According to other embodiments, adversarial training (e.g., in the form of a generative adversarial network (GAN)) may optionally be incorporated into the training workflow, e.g., in order to better refine the re-rendered images from the individual lighting and geometric components estimated by the model.

21 Claims, 6 Drawing Sheets

(56) References Cited

OTHER PUBLICATIONS

Sun, et al., "Single Image Portrait Relighting," arXiv:1905.00824v1 May 2, 2019.
Yu, et al., "InverseRenderNet: Learning single image inverse rendering," Conference on Computer Vision and Pattern Recognition (CVPR) 2019.
Zhou, et al., "Deep Single-Image Portrait Relighting," International Conference on Computer Vision (ICCV) 2019.

* cited by examiner

RELIGHTING IMAGES AND VIDEO USING LEARNED LIGHTING AND GEOMETRY

TECHNICAL FIELD

This disclosure relates generally to the field of digital image processing. More particularly, but not by way of limitation, it relates to techniques for decomposing single images into various lighting and geometry components using an inverse rendering pipeline.

BACKGROUND

One image processing challenge that is faced today involves the decomposition of a single view image (e.g., an RGB image) into its various decomposable, lighting-related components, such as so-called "albedo" (A) and surface normals (N), in addition to estimating the lighting information (L) associated with the image. Albedo refers to a measure of the fraction of light that is reflected off a body or surface (also sometimes referred to as "diffuse light"). Surface normals represent unit vectors in a direction perpendicular to a body or surface of an object.

Applications of this image decomposition task may be useful in subject relighting scenarios, in which, e.g., given the estimated albedo and normals for a subject appearing in an input image, by changing the lighting parameters, realistic-looking relit versions of the input image may be obtained. While this image decomposition task is an ill-posed inverse problem (i.e., there are more than one viable decomposition solutions that could lead to the lighting results observed in the single view RGB image), recent advances in deep machine learning (ML) have paved the way for significant improvements in the performance of this task by learning from a large pool of image data.

So-called "synthetic" datasets, e.g., datasets comprised entirely of computer-generated images, with known ground truth (GT) image components, such as albedo, normals, and lighting, are desirable for fully supervised training. However, models that are merely trained on synthetic datasets often have a hard time generalizing to "real" data, e.g., image data that is captured 'in the wild' by real cameras, due to the huge domain gap between real and synthetic datasets. On the other hand, obtaining real datasets of a sufficient size and variety of imagery—for which ground truth albedo, normal, and lighting information exists—can be very challenging and/or prohibitively expensive. Thus, a lack of direct supervision on these components makes the training process more difficult, due to the inherent ambiguity and ill-posed nature of the decomposition.

Thus, it may be beneficial to provide devices, methods, and non-transitory program storage devices (NPSDs) that enable an inverse image rendering pipeline to be capable of decomposing a single view image into its albedo, normal, and lighting components using a robust machine learning model, which has been trained on a mix of both real and synthetic datasets.

SUMMARY

To attempt to overcome some of the aforementioned problems associated with training an image decomposition model using only real datasets, i.e., datasets for which no ground truth albedo, normal, and lighting information exist, multiple-view images of the same scene may be used. However, in order to address other issues associated with the use of exclusively "real" image data, it may be desirable to use a mix of real and synthetic datasets during training. In such cases, with the synthetic dataset, direct supervision may be applied over the estimation of albedo, normals, and lighting information of the training images by the model. For the real datasets, the reconstructed image should be as close as possible to the original image, and this may be enforced by combining back the estimated lighting and geometry components.

In order to accommodate subject relighting for real datasets, two additional sets of consistencies may be considered: 1) consistency between multiple images of the same scene but with different lightings; and 2) the distribution of the relit/reconstructed images generated by the ML model should be consistent, e.g., having approximately the same distribution as real datasets.

Thus, according to some embodiments described herein, novel ML models are introduced for image reconstruction training and inference workflows, which are able to estimate the intrinsic lighting-related components of single view images, such as the lighting itself, as well as the lighting-invariant geometrical components of the images, including the albedo and surface normals. According to some such embodiments, such models may be trained on a mix of real and synthetic datasets. For training on real datasets, both reconstruction and cross-relighting consistency terms may be imposed. The use of a cross-relighting consistency term allows for the use of multiple images of the same scene— although lit under different lighting conditions—to be used during training. At inference time, the model is still able to operate on a single image. According to other embodiments, adversarial training (e.g., in the form of a generative adversarial network (GAN)) may optionally be incorporated into the training workflow, e.g., in order to better refine the re-rendered images from the individual lighting and geometric components estimated by the model.

According to some embodiments, there is provided a method of rendering a reconstructed version of an input image, comprising: obtaining a neural network configured to decompose images into a plurality of lighting-related components, wherein the neural network is trained on real and synthetic images using one or more self-supervision terms; obtaining an input image; using the neural network to decompose the input image into the plurality of lighting-related components; estimating lighting information for the input image based, at least in part, on the plurality of lighting-related components; and rendering a reconstructed version of the input image based, at least in part, on the input image, the estimated lighting information, and the plurality of lighting-related components. In some instances, the techniques described herein for rendering relit/reconstructed versions of input images may be repeated on a sequence of input image frames and then combined in a single file structure, thereby resulting in a relit/reconstructed video image sequence.

According to some such embodiments, at least one of the one or more self-supervision terms comprises a reconstruction loss term, a cross-relighting loss term, a cyclic consistency loss term, or an adversarial loss term. According to other such embodiments, the plurality of lighting-related components comprises at least one of: an albedo component and a normal component. According to still other such embodiments, the method may further comprise estimating lighting information for the input image further based, at least in part, on desired relighting characteristics for the input image. According to still other such embodiments, the neural network may further comprise a neural network trained in an adversarial fashion, e.g., using a generative adversarial network (GAN), such as a conditional GAN conditioned on one or more ground truth labels for the real and synthetic training images, or other desired techniques.

In some instances, the input images may comprise portrait images including both a subject's face and a background, while, in other instances, the input images may comprise a tightly-cropped subject face extracted from a portrait image (e.g., excluding the image background pixels). Thus, in some such instances, embodiments may further predict a face mask region for input images (e.g., including the face and, optionally, the surrounding hair of a captured subject), wherein the acts of decomposing the input image into the plurality of lighting-related components, estimating lighting information for the input image, and rendering a reconstructed version of the input image are further based, at least in part, on the predicted face mask region for a respective input image (e.g., only decomposing, estimating lighting information, and rendering reconstructing versions of the image pixels occurring within the predicted face mask region of the input image).

In still other embodiments, estimating the lighting information for the input image may further comprise estimating lighting information for the input image further based, at least in part, on: compensating for environmental lighting conditions on a face of a subject captured in the input image; or simulating environmental lighting conditions on a face of an avatar or synthesized 3D model of a face to be composited in the input image.

In other embodiments, there is provided a method of training a ML model to decompose input images into a plurality of lighting-related components, comprising: obtaining a training set comprising a first plurality of images, wherein the first plurality of images comprises synthetic images and/or real images; initializing a neural network configured to decompose images into a plurality of lighting-related components; and for each image in the first plurality of images: decomposing the image into a plurality of lighting-related components using the neural network; generating a reconstructed version of the image based on the plurality of lighting-related components; determining a reconstruction loss term for the image based, at least in part, on the reconstructed version of the image and the plurality of lighting-related components; and refining the neural network based, at least in part, on the reconstruction loss term for the image.

According to some such embodiments, the method may further comprise, for each image in the first plurality of images: determining a discriminator loss for the image, wherein refining the neural network is further based, at least in part, on the determined discriminator loss for the image. According to still other such embodiments, the method may further comprise, for an image in the first plurality of images that is a real image: determining a cross-relighting loss term for the image, wherein refining the neural network is further based, at least in part, on the determined cross-relighting loss term for the image. According to still other such embodiments, the method may further comprise, for an image in the first plurality of images that is a real image: determining a cyclic-consistency loss term for the image, wherein refining the neural network is further based, at least in part, on the determined cyclic-consistency loss term for the image. According to still other such embodiments, the method may further comprise, for an image in the first plurality of images that is a synthetic image: determining one or more loss terms for the image (e.g., a lighting loss term, an albedo loss term, and/or a normal loss term), wherein refining the neural network is further based, at least in part, on the determined one or more loss terms for the image.

Various NPSD embodiments are also disclosed herein. Such NPSDs are readable by one or more processors. Instructions may be stored on the NPSDs for causing the one or more processors to perform any of the digital image processing techniques disclosed herein.

Various programmable electronic devices are also disclosed herein, in accordance with the NPSD and method embodiments enumerated above. Such electronic devices may include one or more image capture devices, such as optical image sensors/camera units; a display; a user interface; one or more processors; and/or a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Exemplary Deep Neural Network Architectures

Figure 1:
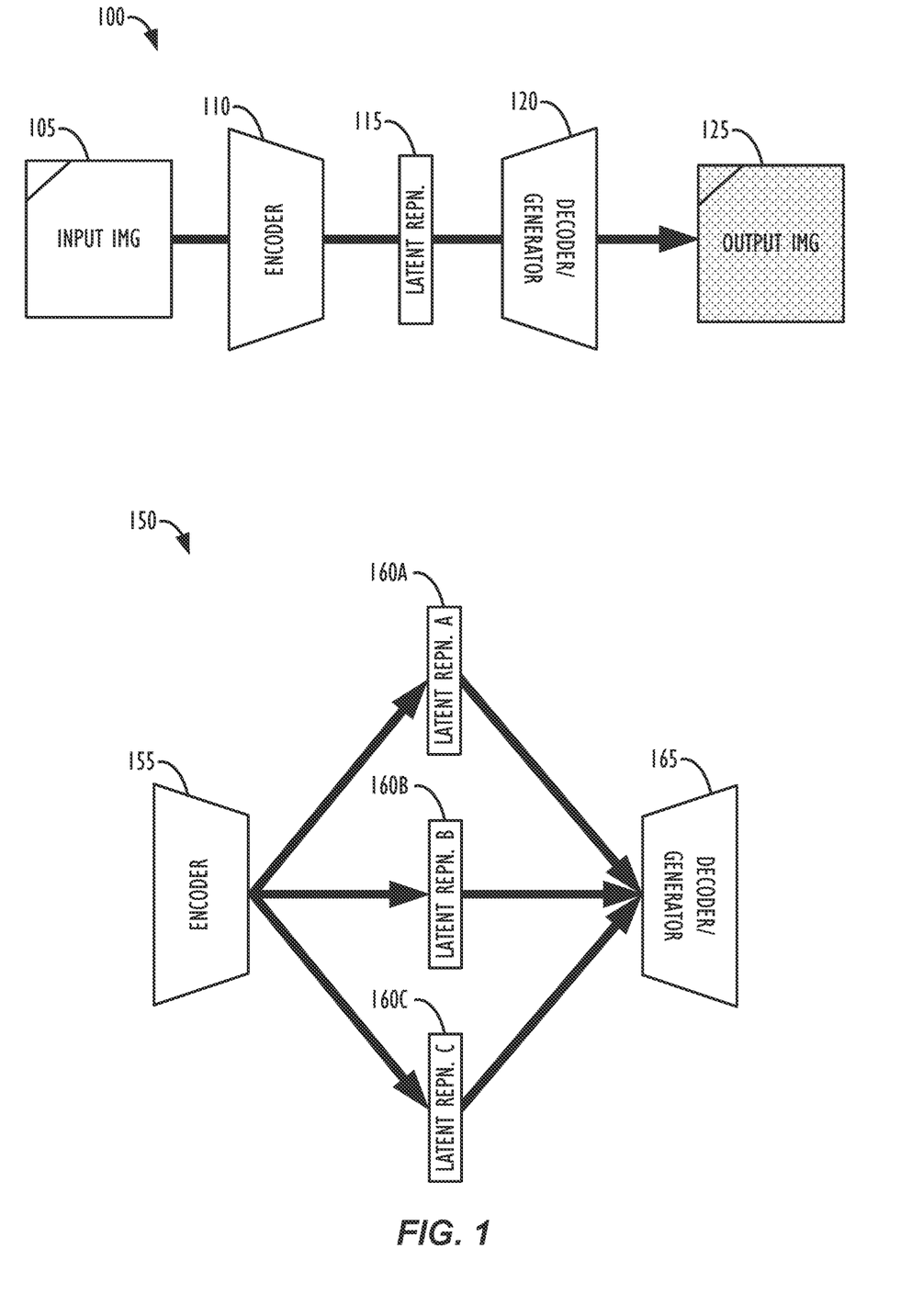
FIG. 1 illustrates exemplary neural network architectures for image encoding and generation, according to one or more embodiments.

Referring now to FIG. 1, exemplary neural network architectures for image encoding and generation are shown, according to one or more embodiments. Turning now to exemplary neural network 100, it is illustrated that, according to some exemplary neural networks, an input image 105 is fed into an encoder sub-network 110, which may serve to interpret the image and encode various features related to the input image 105 into feature embeddings. The resulting feature embedding may take the form of a latent representation (or latent code) 115, which refers to a set of lower-dimensional numerical representations of an image that encapsulate certain abstract properties of the image, such that, in so-called "latent space," the latent representations of images with similar inherent abstract properties with respect to the task at hand are close together in latent space, even if the images' similarity is based on non-observable attributes.

Next, a decoder/generator block 120 of the network may be used to combine the determined features and upsample the image to generate an output image 125, based on the training of the network (e.g., an output image that is a modified version of the input image, based on the application of a target photographic and/or artistic style, lighting characteristics, or the like). While such deep neural networks are quite powerful and can perform highly complex tasks, one difficulty is that there is no way for a human to know what the network is "seeing" internally when it processes an image, and there is also no way to control what the network is going to generate on the output (e.g., if you wanted to make the image a little brighter, change the white balance, change a lighting characteristic(s), such as direction, intensity, color, etc., by changing a lighting vector encapsulating such lighting characteristic(s), and/or remove certain types of artifacts from the output image, etc.). Further, there is no way for humans to interpret or understand the semantic meaning of latent representation (115) that the network generates. Thus, it would be desirable to generate neural networks that provide both: 1.) performance of image decomposition tasks; and 2.) some degree of configurability, in terms of what type of image the generator will generate. For example, if the semantic meanings of the latent representations could be separated into human interpretable components, then such latent representation components could be modified in particular ways to achieve predictable desired results at inference time.

Turning now to exemplary neural network 150, it is illustrated that, according to some exemplary neural networks, an input image may be fed into an encoder sub-network 155, which, as described above, can interpret and discover the various features of the input data, e.g., an input image. According to some network embodiments, the latent representations of the input images determined by the encoder may then be separated and disentangled into multiple discrete latent representation components, e.g., latent representation A (160A), latent representation B (160B), and latent representation C (160C), as illustrated in FIG. 1, each with a separate, interpretable semantic meaning.

At inference time, each latent representation component could then be modified or augmented (e.g., via concatenation) with one or more additional matrices or vectors of values, thereby creating modified latent representation components for the input image. In some cases, the augmented values may comprise encodings of different photographic and/or artistic styles or different lightings that a user may desire to apply to the image encoding, prior to application of the decoding subnetwork 165 and generation of a stylized output image.

Exemplary Image Relighting Processing Pipeline Utilizing a Neural Network Architecture Trained to Learn Image Lighting According to some embodiments described herein, a goal of the exemplary image relighting processing pipeline is to decompose a single view RGB image, I, into albedo (A), surface normal (N), facial mask (M), and lighting (L) components. The albedo and normals may have the same dimensionality as the image, e.g., n×n×3. The facial mask may comprise a representation of a subset of pixels from the input image predicted to contain the face (or face and surrounding hair) from the input image. Furthermore, as lighting is typically defined as a function on a sphere, it may represented by its spherical harmonic (SH) coefficients up to second order. Thus, $L \in \mathbb{R}^{9 \times 3}$, with 9 SH coefficients corresponding to the three channels. While SH coefficients up to second order mainly constitute low frequency terms, they are sufficient to estimate the irradiance up to 1% error. According to some embodiments, it may also be assumed that the image is generated under the Lambertian reflectance assumption, such that:

$$I(p) = f_{render}(A(p), N(p), L) \qquad \text{(Eqn. 1)},$$

where $f_{render}$ is a differentiable function, and p refers to the p-th pixel of the image, I.

Figure 2:
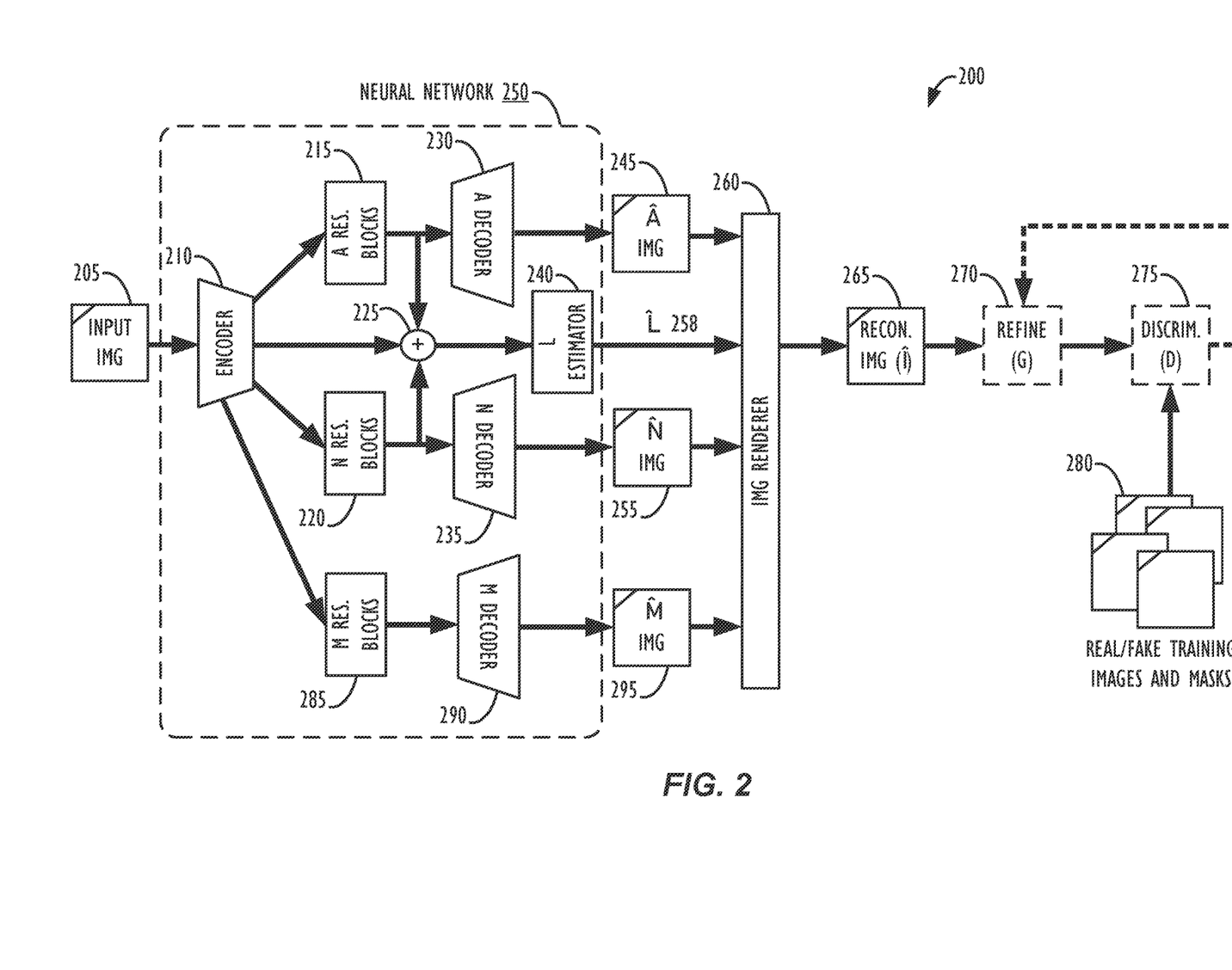
FIG. 2 illustrates an exemplary image relighting processing pipeline including a neural network architecture for learning image lighting, according to one or more embodiments.

Turning now to FIG. 2, an exemplary image relighting processing pipeline 200 including a neural network architecture 250 for learning image lighting is shown, according to one or more embodiments. The neural network architecture 250 of processing pipeline 200 may comprise: 1) an encoder 210, which encodes an input image 205, into an embedded feature representation (e.g., in the form of a matrix); 2) albedo, normal, and face mask residual networks (ResNets) 215, 220, and 285, respectively, which map the image features to albedo, normal, and face mask embeddings; and 3) three decoders, which decode the image's albedo (230), normal (235), face mask (285), and lighting (240) components from the embedded features.

In neural network architecture 250, an input image 205 is first fed to the encoder network 210. The encoder network 210 may comprise a cascade of convolution blocks, followed by a batch normalization operation and one or more rectified linear units (ReLUs). The image features coming out of the encoder are then passed through three separate sets of residual blocks (215/220/285), which determine the albedo and normal features of the input image 205, as well as a predicted mask over the face (or face and surrounding hair) in the input image. These features are then passed on to three different decoders that estimate the images albedo component, e.g., in the form of albedo image, $\hat{A}$ (245), surface normals image, $\hat{N}$ (255), and image facial mask, $\hat{M}$ (295). The decoders may comprise deconvolution layers with batch norm and ReLU. In some embodiments, skip connections may be used between the encoder and decoder layers of the network, if desired, e.g., to aid in the learning of global characteristics of the input image, such as the overall lighting, brightness level, etc., which are not susceptible to localized changes.

To estimate the lighting information for the image, the image, albedo, and normal features may be concatenated (225) on the channel dimension and fed into a trainable light estimator at block 240. (If available, the predicted face mask may also be used to limit the operation of the light estimator at block 240 to only those pixels that are a part of the predicted face mask region within the input image.) This trainable light estimator block may be used to estimate the spherical harmonics coefficients of the lighting, e.g., up to the second order. In some embodiments, the light estimator module may comprise a 1×1 convolution layer, followed by a batch normalization operation, ReLU, and an adaptive average pooling operation that maps the features to a 128-dimensional vector. This vector may then be fed to a fully-connected layer, in order to output a lighting vector (e.g., a 27-dimensional vector), which may be represented as lighting estimate, $\hat{L}$ (258).

Once the image's albedo $\hat{A}$ (245), normal $\hat{A}$ (255), facial mask $\hat{M}$ (295), and lighting $\hat{L}$ (258) components have been estimated by the neural network 250, an image renderer (260) may be used to render a reconstructed image, $\hat{I}$ (265) from the estimated components, e.g., $\hat{I}=f_{render}(\hat{A}, \hat{N}, \hat{L}, \hat{M})$. In embodiments where a facial mask $\hat{M}$ (295) is employed to further increase efficiency of the rendering operation, all regions of the image other than those contained within facial mask $\hat{M}$ (295) may be ignored by the image renderer (260) during the rendering of the reconstructed image, $\hat{I}$ (265).

According to some embodiments, the neural network architecture may also include a conditional generative adversarial network (GAN) to attempt to make the re-rendered images look more natural and further reduce the artifacts. For this purpose, a generator network (G) 270 may refine the reconstructed image $\hat{I}$ (265). Then, a discriminator network (D) 275 may optionally be used to score real and "fake" training images (which may include "ground truth" face mask information) (280), including the refined reconstructed image $\hat{I}$ (265), e.g., with higher scores corresponding to more natural looking images (including images that more accurately predict the face mask region for the image) and lower scores corresponding to images that the discriminator is able to determine are not "real" images.

Figure 3:
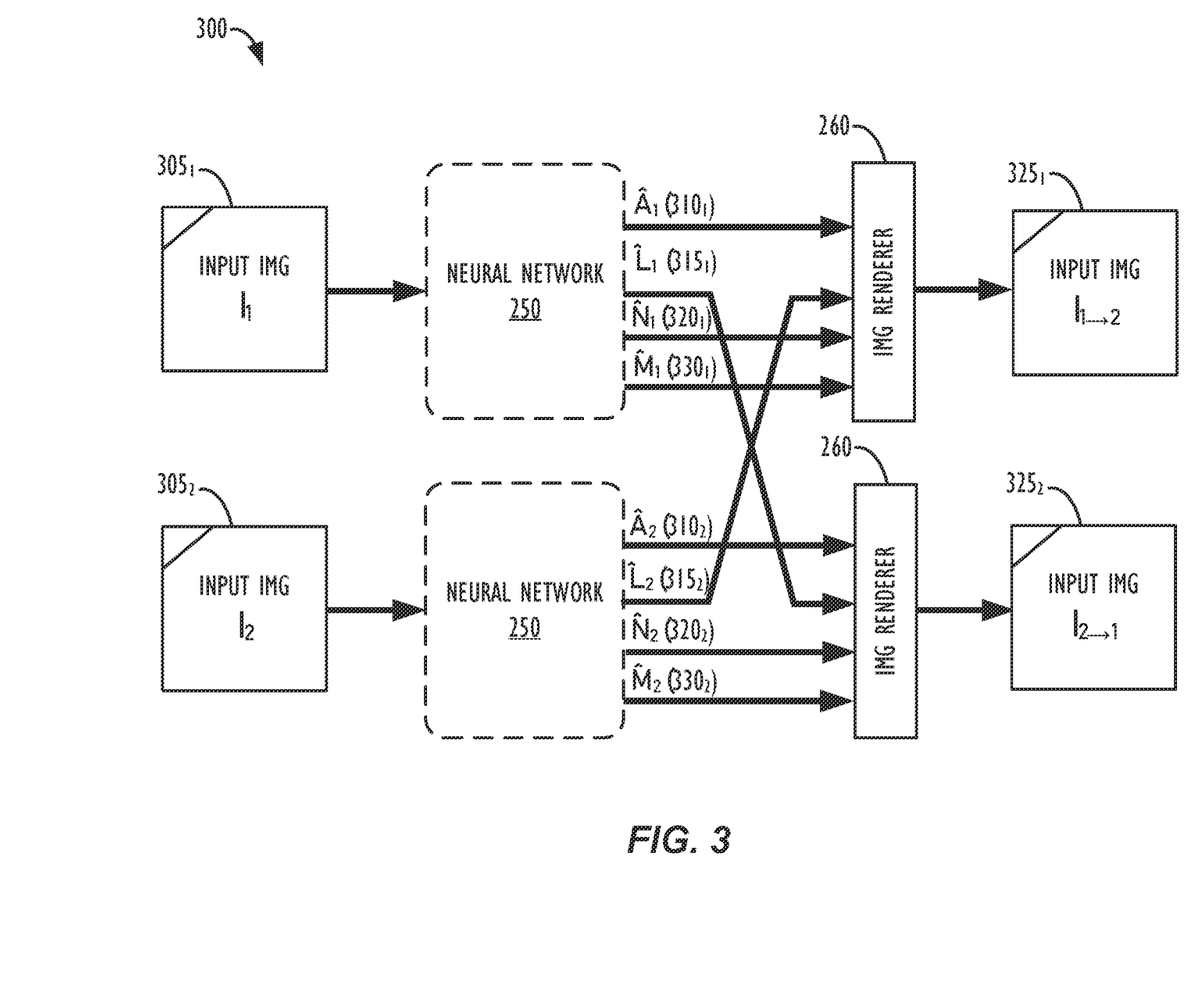
FIG. 3 illustrates an exemplary image relighting processing pipeline including a neural network architecture for learning image lighting and cross-relighting losses, according to one or more embodiments.

Turning now to FIG. 3, an exemplary image relighting processing pipeline 300 including a neural network architecture for learning image lighting and cross-relighting losses is shown, according to one or more embodiments. The cross-relighting loss determination process, which may be used during training, e.g., on images for which no ground truth lighting information exists, may involve applying lighting information estimated from a second image, $I_2$ (305$_2$) to a first image, $I_1$ (305$_1$), and vice versa.

To explain cross-relighting consistency terms, consider a scenario wherein the first and second images share the same albedo (A), normal (N), and face mask (M) components and are only different in terms of lighting information (L), i.e., wherein $I_1=f_{render}(A, N, M, L_1)$ and $12=f_{render}(A, N, M, L_2)$. After utilizing the neural network 250 to estimate the albedo, normals, and face mask for $I_1$ (i.e., 310$_1$, 320$_1$, and 330$_1$, respectively) and the albedo, normals, and face mask for 12 (i.e., 310$_2$, 320$_2$, and 320$_3$, respectively), it is expected that the estimated albedo and normals of the two images will be close. Furthermore, by swapping the estimated lighting for the two images (i.e., estimated lighting 315$_1$ for $I_1$ and estimated lighting 315$_2$ for $I_2$), it is further expected that using image renderer 260 to render an image as $f_{render}(\hat{A}_1, \hat{N}_1, \hat{M}_1, \hat{L}_2)$ will be close to $I_2$ and, likewise, rendering an image as $f_{render}(\hat{A}_2, \hat{N}_2, \hat{M}_2, \hat{L}_1)$ will be close to $I_1$. This assumption may be used to add further consistency between the relit first and second images, which may be helpful during image training.

In some cases, the first and second images for which a cross-relighting consistency term is determined may be images of the same scene, taken with different lighting (e.g., images from a multi-lit data set). In other cases, however, the first and second images may be different images. The theory behind the usefulness of cross-relighting losses is that lighting from another image (even an image of a different scene or a differently-lit version of the same image) can still be informative as to how a given image should look, from a lighting standpoint, when reconstructed.

Thus, according to some such embodiments, the relit images may be represented as: $I_{2\to1}$ (325$_2$)=$f_{render}(\hat{A}_2, \hat{N}_2, \hat{M}_2, \hat{L}_1)$, i.e., the second image relit with the estimated lighting information of the first image, and $I_{1\to2}$ (325$_1$)=$f_{render}(\hat{A}_1, \hat{N}_1, \hat{M}_1, \hat{L}_2)$, i.e., the first image relit with the estimated lighting information of the second image. The difference between the relit images and the corresponding ground truths (i.e., represented as $d(\hat{I}_{2\to1}, I_1)$ and $d(\hat{I}_{1\to2}, I_2)$) may then be considered in an overall image loss function that the training operation is attempting minimize, as will be explained in further detail below.

Figure 4A:
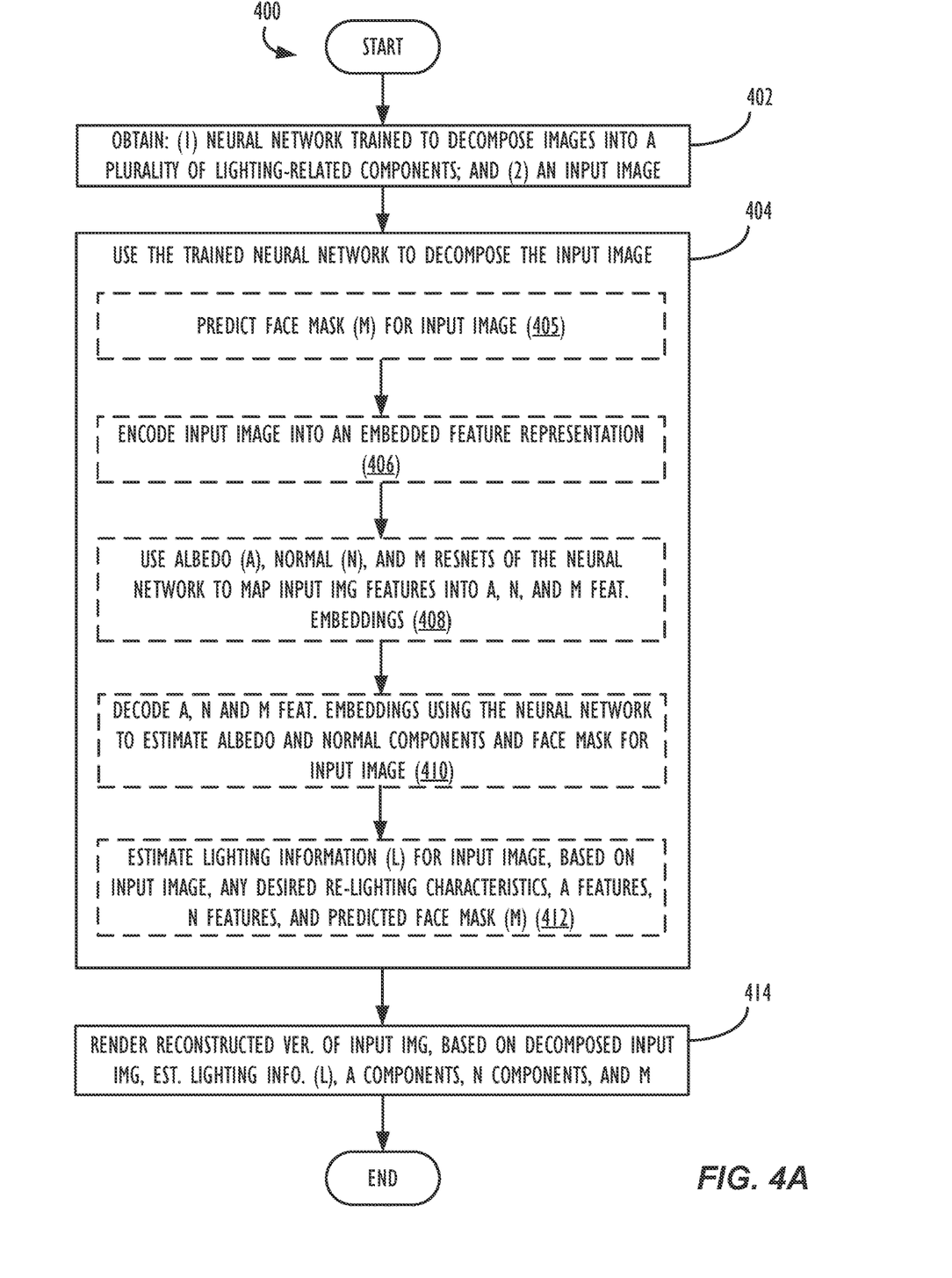
FIG. 4A is a flow chart illustrating a method of image encoding and reconstruction using a neural network, according to various embodiments.

Exemplary Methods for Using and Training Neural Networks to Learn Lighting and Geometry from Single Images Turning now to FIG. 4A, a flow chart illustrating a method 400 of image encoding and reconstruction using a neural network is shown, according to various embodiments. First, at Step 402, the method 400 may obtain: (1) a neural network trained to decompose images into a plurality of lighting-related components; and (2) an input image. Next, at Step 404, the method 400 may use the trained neural network to decompose the input image. The image decomposition task may, in some embodiments, comprise predicting a face mask for the input image (Step 405). The face mask may comprise a bit mask, polygon, or other representation of the pixels within the input image that are determined to likely be part of a subject's face. Traditional face detection algorithms and/or machine learning methods trained to identify subject faces in captured images may be used to determine the boundaries of the predicted face mask within the input image, as described above with reference to FIG. 2. As described above, the image decomposition task may further comprise encoding the input image into an embedded feature representation (Step 406). Next, the neural network may use one or more albedo (A), normal (N), and/or face mask (M) residual neural sub-networks (i.e., ResNets) to map the input image's relevant A, N, and M features into A, N, and M feature embeddings (Step 408). Next, the neural network may decode the A, N, and M feature embeddings in order to estimate the albedo and normal components for the input image, as well as the face mask region (Step 410). Finally, in some embodiments, the neural network may estimate lighting information (L) for input image, based on: the input image; any desired re-lighting characteristics; the face mask M; and the A features and N features (Step 412). Desired re-lighting characteristics may, e.g., comprise one or more indications from a user to change one or more characteristics of the lighting that has been estimated for a given image, such as the direction, distance, intensity, color, quality, or other characteristic of the estimated lighting for the image. For example, in some instances, a user may desire to relight an image by having the lighting appear to shine onto the right side of a subject's face rather than the left side of the subject's face in the reconstructed output image.

Finally, at Step 414, the method 400 may then render a reconstructed version of the input image, based on the decomposed input image, estimated lighting information (L), the predicted face mask (M), and the estimated A and N components.

In embodiments wherein a face mask is predicted for the input image at Step 405, rendering the reconstructed version of the input image based on the decomposed input image, estimated lighting information (L), and the estimated A and N components may comprise rendering reconstructed (e.g., relit) image pixels only for the portion of the input image falling within the predicted face mask (M̂), i.e., leaving the pixels in the background or "non-face" portion of the input image unaltered, and then compositing the relit face back onto the original background or "non-face" portion of the input image.

In other embodiments, if a neural network is passed an already-cropped subject face from an image as input (e.g., a face mask determined by some other upstream processing), then the neural network may perform its decomposition and reconstruction operations without also predicting a face mask for the input image using the neural network at Step 405.

In some embodiments, the method 400 may be performed iteratively on a sequence of captured images over time (e.g., on the images in a captured video image sequence, on a video stream captured during a live videoconference, etc.). In this way, the face of a subject appearing in captured input images may be dynamically relit in different ways over time during the duration of the captured image sequence.

In some instances, the dynamic relighting of a subject over a sequence of captured images may be performed to compensate for changing environmental lighting conditions. For example, if the environmental lighting conditions around a subject that is being captured suddenly become darker, this may be determined by an image capture device's ambient light sensors (ALS), image sensors, or the like, and the method 400 may determine appropriate desired re-lighting characteristics in response to the determined change in environmental lighting conditions. For example, the method 400 may brighten up the face of the subject if the ambient lighting suddenly become darker, or it may adapt the rendered lighting if the subject moves from an outdoor environment to an indoor environment, and/or it may account for the fact that the subject has moved into a differently-colored lighting environment at some point during the duration of the captured image sequence (e.g., into or out of a warmer lighting environment or a cooler lighting environment). In other words, the method 400 may relight the subject with any desired re-lighting characteristics, e.g., with respect to changing environmental light direction (e.g., by applying realistic shading on the subject's face based on the current direction of the environmental light), changing the intensity of the lighting applied to the subject's face in the reconstructed image, and/or changing the color of the lighting applied to the subject's face in the reconstructed image.

In still other embodiments, the input image may comprise the face of an avatar and/or a synthesized 3D model of a face (i.e., as opposed to a captured image of a real human face). In some such embodiments, the avatar/3D model of the face may appear in an input image (or in a video image stream) while being composited over a "real" background, i.e., a background that is at least partially captured by a camera, rather than being simulated or synthetic. In such embodiments, the method 400 may relight the avatar/3D model face to simulate, adapt, recreate, or otherwise react to changing environmental lighting conditions. For example, if a bright light suddenly came on above the head of an avatar/3D model being composited in a real-world environment wherein a video stream including the avatar/3D model was being captured, the method 400 may use the neural network to adaptively reconstruct a version of the captured input image that attempts to accurately simulate a bright light shining from above onto the facial surface of the avatar/3D model. Then, as the real-world environment lighting conditions continued to change with respect to the position and orientation of the avatar/3D model within the composited video stream, the method 400 may continue to use the neural network to adaptively reconstruct versions of the captured input images that continue to attempt to accurately simulate the current environmental lighting conditions. As will be understood, more realistic and accurate image relighting effects for avatars/3D models may be produced when the neural network has been trained specifically with variously-lit images of the faces of synthesized avatars and 3D models composited into real-world lighting environment that are similar to those lighting conditions the network will be asked to simulate onto synthesized avatars/3D models at inference time.

Figure 4B:
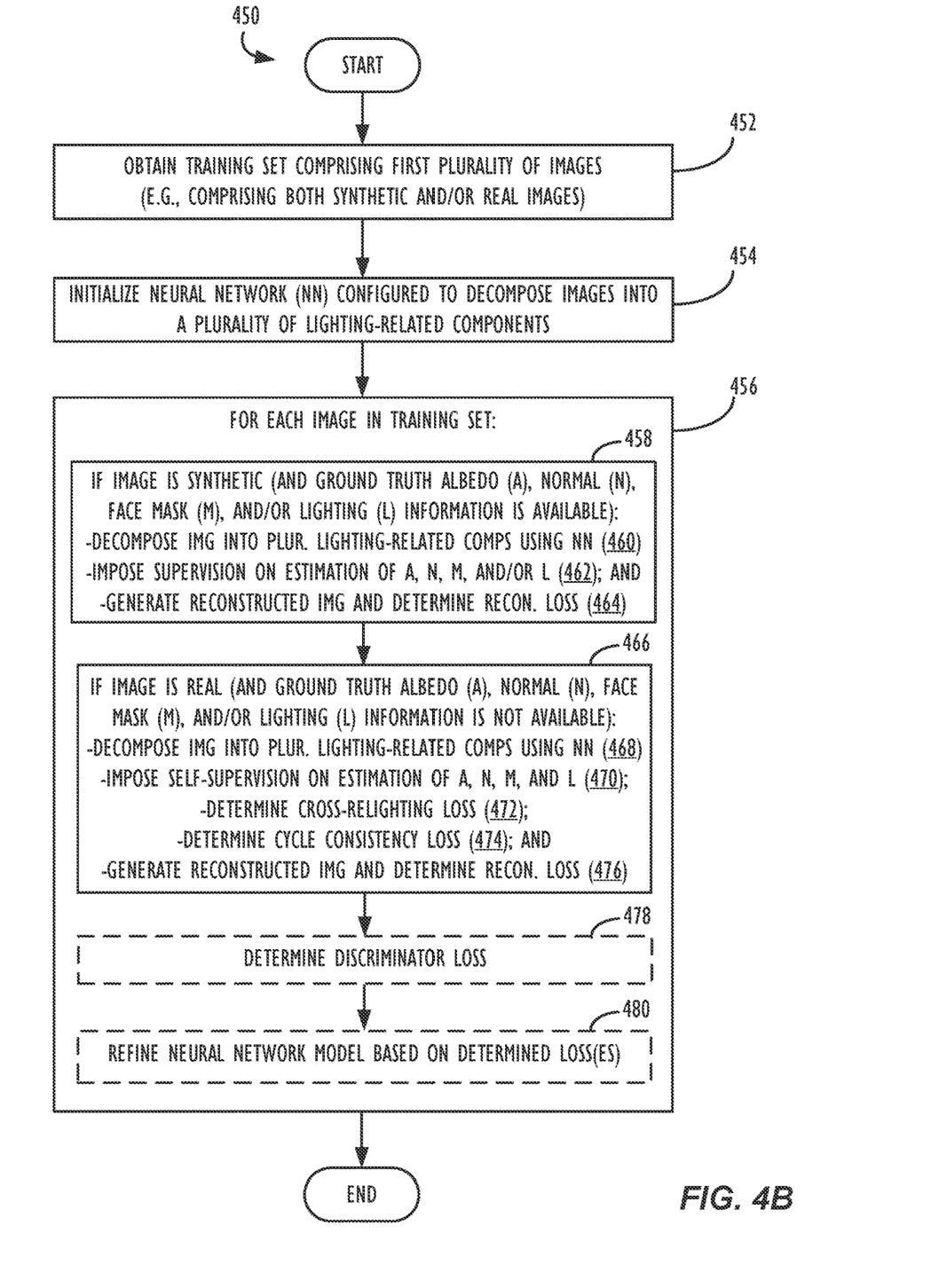
FIG. 4B is a flow chart illustrating a method of training a neural network for image encoding and reconstruction, according to various embodiments.

Turning now to FIG. 4B, a flow chart illustrating a method 450 of training a neural network for image encoding and reconstruction is shown, according to various embodiments. First, at Step 452, the method 450 may obtain a training set of image data comprising first plurality of images (e.g., comprising both synthetic and/or real images, preferably images of a high quality level, sufficient resolution, and containing a wide variety of subjects, backgrounds, facial orientations, lighting conditions, etc. that are representative of the images the neural network will be asked to process at inference time). Next, at Step 454, the method 450 may initialize a neural network that is to be configured to decompose images into a plurality of lighting-related components. Next, at Step 456, the method 450 may being to train itself over each of the various images in the training set.

For example, if, at Step 458, an image in the training set is a synthetic image (i.e., an image for which ground truth albedo (A), normal (N), face mask (M), and/or lighting (L) information is available), the method 450 may proceed by: decomposing the image into a plurality of lighting-related components (e.g., the aforementioned A and N and/or a face mask M comprising only the pixels from the training image estimated or determined to be part of a captured subject's face) using the neural network (460); imposing supervision on estimation of A, N, M, and/or L components of the image (and their corresponding loss terms) (462); and generating a reconstructed image based on the estimated components and determining a reconstruction loss term (464), e.g., based on differences between the reconstructed image and the original image, with a network training goal of minimizing the reconstruction loss term, as well as albedo, normal, face mask, and/or lighting loss terms.

If, instead, at Step 466, an image in the training set is a real image (i.e., an image for which ground truth albedo (A), normal (N), face mask (M), and/or lighting (L) information is not available), the method 450 may proceed by: decomposing the image into a plurality of lighting-related components (e.g., the aforementioned A and N and/or a face mask M, comprising only the pixels from the training image estimated or determined to be part of a captured subject's face) using the neural network (468); imposing a form of self-supervision on the network's estimation of the image's A, N, M, and L components (470) (e.g., as described above with reference to FIG. 2); determining a cross-relighting loss term (472) (e.g., as described above with reference to FIG. 3); determining a cycle consistency loss term (474) (wherein a cycle consistency loss term may be defined as: $\|I_1 - \hat{I}_{1\to 2\to 1}\|_1 + \|I_2 - \hat{I}_{2\to 1\to 2}\|_1$, i.e., a measure of the difference between the first image and the estimated first image as relit by the estimated lighting of the second image and then lit again by the estimated lighting of the first image summed with a measure of the difference between the second image and the estimated second image as relit by the estimated lighting of the first image and then lit again by the estimated lighting of the second image); and generating a reconstructed image and determining a reconstruction loss term for the reconstructed image (476). It has been determined that adding additional consistency terms, e.g., in the form of the aforementioned cross-relighting loss term, reduces the need for pseudo-supervision during training. (In this context, "pseudo-supervision" may refer to using the albedos and normals estimated by a model that was pre-trained on only synthetic data to provide supervision during the training of a model being trained on a mix of synthetic and real data.)

As with Step 458 training on synthetic images, the network training goal for real images at Step 466 may also be to minimize an overall loss term, which, in the case of real images, may comprise the aforementioned cross-relighting loss term, cycle consistency loss term, and/or reconstruction loss terms.

Next, at Step 478, in embodiments wherein a generative model is also used to refine the reconstructed image, an adversarial loss term, e.g., as determined using a discriminator network, may be determined to further modify the overall loss term for the image.

As may now be understood, depending on what type of image is being trained upon (e.g., synthetic image versus real image) and what types of ground truth information is available, the overall loss term to be minimized by the network may be represented as:

$$\mathcal{L} = \lambda_A \mathcal{L}_A + \lambda_N \mathcal{L}_N + \lambda_L \mathcal{L}_L + \lambda_M \mathcal{L}_M + \lambda_{rec} \mathcal{L}_{rec} + \lambda_{relit} \mathcal{L}_{relit} + \lambda_{GAN} \mathcal{L}_{GAN} \quad \text{(Eqn. 2)},$$

where $\mathcal{L}_A$, $\mathcal{L}_N$, $\mathcal{L}_M$, and $\mathcal{L}_L$ correspond to the albedo, normal face mask prediction, and lighting loss terms, respectively, and $\lambda_X$ refers to a strength value or weighting factor applied to a given loss component, X, of the overall loss term for the image.

Furthermore, $\mathcal{L}_{rec}$ and $\mathcal{L}_{relit}$ refer to the aforementioned reconstruction and relighting consistency loss terms, which may be defined as:

$$\mathcal{L}_{rec} = d(f_{render}(\hat{A}_1, \hat{N}_1, \hat{M}_1, \hat{L}_1), I_1) + d(f_{render}(\hat{A}_2, \hat{N}_2, \hat{M}_2, \hat{L}_2), I_2) \quad \text{(Eqn. 3)},$$

$$\mathcal{L}_{relit} = d(f_{render}(\hat{A}_1, \hat{N}_1, \hat{M}_1, \hat{L}_2), I_2) + d(f_{render}(\hat{A}_2, \hat{N}_2, \hat{M}_2, \hat{L}_1), I_1) \quad \text{(Eqn. 4)},$$

with $d(\hat{x},x)$ denoting any desired distance metric between $\hat{x}$ and $x$, e.g., an L1 or L2 distance metric.

Finally, according to some embodiments, if a GAN model is included in the training process, a Wasserstein GAN may be employed, e.g., with a gradient penalty (WGAN-GP) and an adversarial loss $\mathcal{L}_{GAN}$ defined as:

$$\mathcal{L}_{GAN} = D(I_{real}) - D(G(\hat{I})) + \gamma \|\nabla_y D(y) - 1\|^2 \quad \text{(Eqn. 5)},$$

where the last term in Eqn. 5 corresponds to the gradient penalty term, γ is a linear interpolation between a real sample, $I_{real}$, and one refined by the generator, G, i.e., $$y = \alpha I_{real} + (1-\alpha) D(G(\hat{I})) \quad \text{(Eqn. 6)}$$

wherein $\alpha \in (0,1)$, and $\nabla_y$ refers to the gradient of the discriminator with respect to its input, when the input is equal to the interpolated image. (Note that γ, in this context, refers to the weight of the gradient penalty term.) It is to be understood that other types of GAN training may also be employed, in a given implementation, e.g., a conditional GAN (i.e., conditioned on one or more ground truth labels for the real and/or synthetic training images) using log losses.

Finally, at Step 480, the neural network model may be refined based on the determined overall loss term for the image, with a network training goal to minimize the overall loss term. (Note: The optionality of the performance of certain steps in FIGS. 4A and 4B is indicated by the use of dashed line boxes.)

Exemplary Electronic Computing Devices

Figure 5:
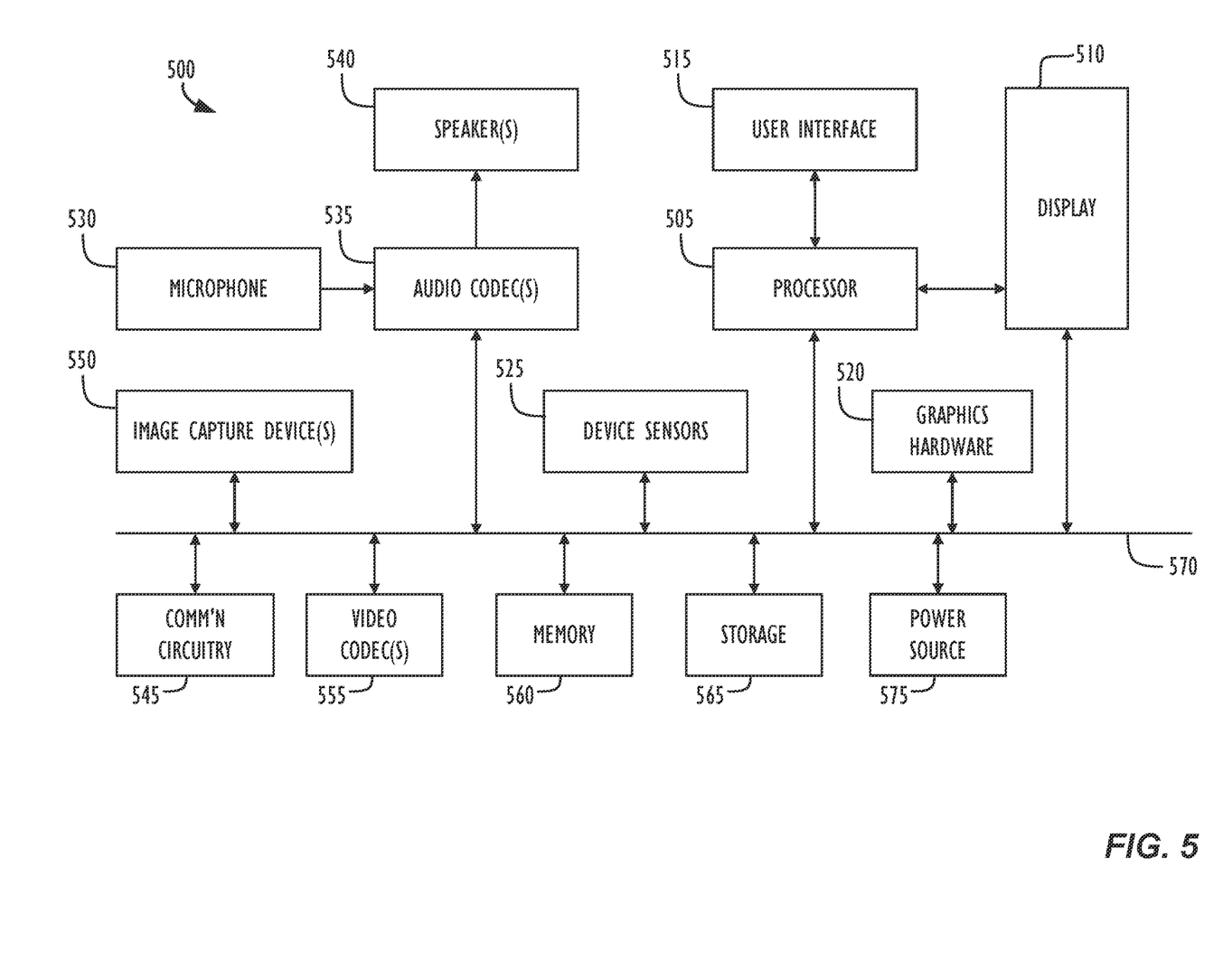
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera units configured to capture images, e.g., images which may be processed to reconstruct differently-lit versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565.

Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums or NPSDs including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device (NPSD) comprising computer readable instructions executable by one or more processors to:
   obtain a neural network configured to decompose images into a plurality of lighting-related components, wherein the neural network is trained on real and synthetic images using one or more self-supervision terms, wherein at least one of the one or more self-supervision terms comprises a cross-relighting loss term, and wherein the cross-relighting loss term comprises computing a difference between: (1) a first image that is relit with estimated lighting for a second image; and (2) the second image;
   obtain an input image;
   use the neural network to decompose the input image into the plurality of lighting-related components;
   estimate lighting information for the input image based, at least in part, on the plurality of lighting-related components; and
   render a reconstructed version of the input image based, at least in part, on the input image, the estimated lighting information, and the plurality of lighting-related components.

2. The NPSD of claim 1, wherein at least one of the one or more self-supervision terms further comprises a reconstruction loss term, a cyclic consistency loss term, or an adversarial loss term.

3. The NPSD of claim 1, wherein the plurality of lighting-related components comprises at least one of: an albedo component and a normal component.

4. The NPSD of claim 1, wherein the instructions to estimate lighting information for the input image further comprise instructions to:
   estimate lighting information for the input image further based, at least in part, on desired relighting characteristics for the input image.

5. The NPSD of claim 1, wherein the neural network is further configured to predict a face mask region for input images, and wherein the acts of decomposing the input image into the plurality of lighting-related components, estimating lighting information for the input image, and rendering a reconstructed version of the input image are further based, at least in part, on the predicted face mask region for a respective input image.

6. The NPSD of claim 1, wherein the neural network is trained in an adversarial fashion.

7. The NPSD of claim 1, wherein the acts of obtaining an input image, decomposing the input image into the plurality of lighting-related components, estimating lighting information for the input image, and rendering a reconstructed version of the input image are repeated iteratively, thereby producing a reconstructed video image sequence.

8. The NPSD of claim 1, wherein the instructions to estimate lighting information for the input image further comprise instructions to estimate lighting information for the input image further based, at least in part, on:
   compensating for environmental lighting conditions on a face of a subject captured in the input image; or
   simulating environmental lighting conditions on a face of an avatar or synthesized 3D model of a face to be composited in the input image.

9. A system, comprising:
   one or more processors; and
   one or more non-transitory program storage devices comprising computer readable instructions executable by the one or more processors to:
      obtain a neural network configured to decompose images into a plurality of lighting-related components, wherein the neural network is trained on real and synthetic images using one or more self-supervision terms, wherein at least one of the one or more self-supervision terms comprises a cross-relighting loss term, and wherein the cross-relighting loss term comprises computing a difference between: (1) a first image that is relit with estimated lighting for a second image; and (2) the second image;
      obtain an input image;
      use the neural network to decompose the input image into the plurality of lighting-related components;
      estimate lighting information for the input image based, at least in part, on the plurality of lighting-related components; and
      render a reconstructed version of the input image based, at least in part, on the input image, the estimated lighting information, and the plurality of lighting-related components.

10. The system of claim 9, wherein at least one of the one or more self-supervision terms further comprises a reconstruction loss term, a cyclic consistency loss term, or an adversarial loss term.

11. The system of claim 9, wherein the plurality of lighting-related components comprises at least one of: an albedo component and a normal component.

12. The system of claim 9, wherein the instructions to estimate lighting information for the input image further comprise instructions to:

estimate lighting information for the input image further based, at least in part, on desired relighting characteristics for the input image.

13. The system of claim 9, wherein the neural network is further configured to predict a face mask region for input images, and wherein the acts of decomposing the input image into the plurality of lighting-related components, estimating lighting information for the input image, and rendering a reconstructed version of the input image are further based, at least in part, on the predicted face mask region for a respective input image.

14. The system of claim 9, wherein the neural network is trained in an adversarial fashion.

15. The system of claim 9, wherein the acts of obtaining an input image, decomposing the input image into the plurality of lighting-related components, estimating lighting information for the input image, and rendering a reconstructed version of the input image are repeated iteratively, thereby producing a reconstructed video image sequence.

16. The system of claim 9, wherein the instructions to estimate lighting information for the input image further comprise instructions to estimate lighting information for the input image further based, at least in part, on:
    compensating for environmental lighting conditions on a face of a subject captured in the input image; or
    simulating environmental lighting conditions on a face of an avatar or synthesized 3D model of a face to be composited in the input image.

17. A method, comprising:
    obtaining a training set comprising a first plurality of images, wherein the first plurality of images comprises at least one synthetic image and at least one real image;
    initializing a neural network configured to decompose images into a plurality of lighting-related components; and
    for each image in the first plurality of images:
        decomposing the image into a plurality of lighting-related components using the neural network;
        generating a reconstructed version of the image based on the plurality of lighting-related components;
        determining a cross-relighting loss term for the image if the image is a real image, wherein the cross-relighting loss term comprises computing a difference between: (1) a version of the image that is relit with estimated lighting for another image in the first plurality of images; and (2) the another image;
        determining a reconstruction loss term for the image based, at least in part, on the reconstructed version of the image and the plurality of lighting-related components; and
    refining the neural network based, at least in part, on:
        (a) the reconstruction loss term for the image; and
        (b) the cross-relighting loss term for the image, if the image is real image.

18. The method of claim 17, further comprising:
for each image in the first plurality of images:
    determining a discriminator loss for the image,
    wherein refining the neural network is further based, at least in part, on:
(c) the determined discriminator loss for the image.

19. The method of claim 17, further comprising:
for an image in the first plurality of images that is a real image:
    determining a cyclic-consistency loss term for the image,
    wherein refining the neural network is further based, at least in part, on:
(c) the determined cyclic-consistency loss term for the image.

20. The method of claim 17, further comprising:
for an image in the first plurality of images that is a synthetic image:
    determining one or more loss terms for the image,
    wherein refining the neural network is further based, at least in part, on:
(c) the determined one or more loss terms for the image.

21. The method of claim 20, wherein the one or more loss terms comprise at least one of: a lighting loss term, an albedo loss term, a face mask prediction loss term, and a normal loss term.

* * * * *